United States Patent [19]

Lamy et al.

[11] Patent Number: 4,509,384
[45] Date of Patent: Apr. 9, 1985

[54] MANUAL GEARBOX RATIO CHANGE CONTROL DEVICE

[75] Inventors: Jean-Michel Lamy, Paris; Jean-Jacques Boutant, Rueil Malmaison, both of France

[73] Assignee: Regie Nationale des Usines Renault, Boulogne-Billancourt, France

[21] Appl. No.: 408,120

[22] Filed: Aug. 13, 1982

[30] Foreign Application Priority Data

Aug. 14, 1981 [FR] France ................. 81 15745

[51] Int. Cl.³ .............................................. G05G 9/18
[52] U.S. Cl. ................................ 74/473 R; 74/473 P
[58] Field of Search ........... 74/473 R, 473 P, 473 SW

[56] References Cited

U.S. PATENT DOCUMENTS 3,550,467 12/1970 Forichon ..................... 74/473 R
3,613,474 10/1971 Baumgartl .................. 74/473 R X
3,645,145  2/1972 Galas ........................ 74/473 R

FOREIGN PATENT DOCUMENTS 1116545 11/1961 Fed. Rep. of Germany .
3002968  7/1981 Fed. Rep. of Germany .
2022743 10/1969 France .

Primary Examiner—Allan D. Herrmann
Attorney, Agent, or Firm—Owen, Wickersham & Erickson

[57] ABSTRACT

The low demultiplication manual control lever (1) swivels at a fixed point (2) by means of an elastic block (3). The lever's (1) longitudinal and transverse movements are transmitted by a change rod (6) to a demultiplication link (9) at one point of which an output lever (14) is fixed by a joint (16), this output lever (14) being connected to the control shaft (13) carrying the peg (12) changing the gears in the gearbox.

Therefore the demultiplication of the manual lever (1) movement is performed immediately next to the gearbox and partly inside it. This results in excellent efficiency with respect both to force and to movement.

6 Claims, 3 Drawing Figures

MANUAL GEARBOX RATIO CHANGE CONTROL DEVICE

The present invention relates to a manual device providing for control of the changing of speed ratios in an automotive vehicle gearbox, comprising a manually actuated control lever swivelling round a fixed point and transmitting the movement applied to it to a gear change peg installed inside the gearbox, by means of a set of control linkages consisting notably of a gear change rod placed between the gearbox and the manual lever.

In order to control the gear ratios of an automotive vehicle gearbox suitable demultiplication of the manual control lever movements must be carried out. The effects of the movements of the vehicle engine on the gearbox control device should also be mitgated by suitable decoupling. Finally, it is necessary to filter out the vibrations due to engine noises transmitted by the control device.

In order to solve these problems the general rule is to use a manual control lever placed in the vehicle passenger compartment and hinged so as to provide a substantial demultiplication, in the order of 4 or 5. Therefore the total demultiplication required, which is generally around 6 to 7, is produced to the extent of 90% by the manual control lever itself.

The size of this demultiplication at the beginning of the manual control means that the rest of the control device kinematic chain transmits a large force, which leads to force losses and significant wear in the various component parts. The result is low efficiency and low reliability of conventional type control devices.

In order to filter out the engine vibrations elastic elements are generally placed at one or more points in the kinematic chain; however these elements work under poor conditions because of the large force that has to be transmitted owing to the demultiplication performed by the manual lever. This results in considerable parasitic movements and in poor translational efficiency of the various elements of the control. Furthermore, engine movements are amplified by the demultiplication of the manual control lever.

In order to eliminate part of these drawbacks attention has already been directed to using a reaction rod connecting the manual control lever hinge point in the passenger compartment to the gearbox, and this in the longitudinal direction of the vehicle, i.e. in the direction of the forces. Thus a parallelogram has been formed between the reaction rod, the manual control lever and the links transmitting the movements of the control lever. Moreover, in these embodiments of known type the assembly formed by the reaction rod and the manual control lever is elastically suspended by means of vibration filtering blocks fastened to the vehicle floor. Thus one avoids connecting the control lever rigidly to the vehicle floor so enabling engine vibrations to be filtered out with respect to the vehicle floor and therefore with respect to the passenger compartment, whilst eliminating the flexible filter elements normally fitted into the actual kinematic chain.

However, this improvement of conventional solutions leads to other shortcomings owing to the weight of the assembly, its bulk and the extra components that have to be provided and which lead to cost increases.

The object of the present invention is to provide a simple solution to the principal problems mentioned above, by producing a speed ratio change or gear shift device in which the demultiplication due to the manual lever is low, whilst the main part of the required demultiplication is achieved at the end of the kinematic chain, i.e. immediately next to or partly inside the gearbox.

Another object of the invention is a control device in which the vibrations are filtered out by means of flexible elements integrated in parallel with the kinematic chain, i.e. at a single hinge or swivel point, thus practically eliminating any angular or translational error in the kinematic chain.

It therefore becomes possible to obtain a control device of low weight and low bulk owing to the small number of component parts and one which provides excellent efficiency as regards both force and movement.

The manual gearbox gear ratio change device for automotive vehicles according to the invention comprises a manually operated control lever fitted with a swivel point that is fixed with respect to the vehicle chassis or shell. A gear change peg is installed inside the gearbox and can be subjected to a rotary movement round a control shaft and to a translational movement along the control shaft axis. The change rod is connected at one of its ends to the manual control lever in order to transmit the manual lever movements to the gear change peg. The change rod is fastened at one of its ends to the manual lever by a joint having one degree of freedom in rotation and at its other end to a demultiplication device fitted at least partly in the gearbox through a joint with one degree of freedom in rotation.

The demultiplication device preferably comprises a demultiplication link fastened onto the gearbox by means of a ball joint and an output lever fixed to the gear change peg control shaft and hinged at a point on the demultiplication link. The point at which the output lever is hinged on the demultiplication link can be shifted by sliding to get the required demultiplication.

The change rod is preferably connected by a joint to one of the ends of the demultiplication link, the other end of which is fixed to the gearbox by means of a ball joint.

In order to filter out the vibrations the manual control lever is preferably fitted onto the vehicle chassis or shell by means of a ball joint and an elastic bloc.

In a preferred embodiment the change rod is placed roughly in the longitudinal direction of the vehicle, with the demultiplication link being itself approximately orthogonal.

In all cases the fixed swivel point of the manual control lever is placed on the said lever in such a way that the demultiplication due to the manual lever amounts to about 1.5, with the whole of the control device producing a total demultiplication of around 6 to 7. In these conditions it can be seen that the main part of the demultiplication is achieved by the demultiplication device located close to or even partly inside the gearbox.

This invention will be more clearly understood on studying the detailed description of an embodiment taken as a non-restrictive example and illustrated by the appended drawings in which.

Figure 1:
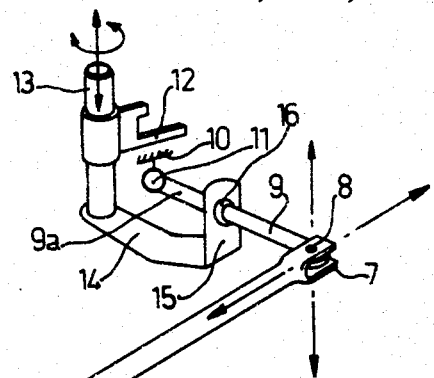
FIG. 1 is a schematic perspective view of the main elements of the control device of the invention.

As shown in the figures the control device of the invention comprises a manually operated control lever 1 fixed to the floor of the vehicle by means of a ball joint 2 fixed to the floor by means of an elastic block 3. Thus the lever 1 in this way swivels at a single fixed point separating the lever into an upper portion 1a and a lower portion 1b, whose length is slightly less than the length of the upper portion 1a, so as to provide a demultiplication of about 1.5. At the end of the lower part 1b of the lever 1 a pin 4 is mounted horizontally so as to work in conjunction with the two vertical straps of a clevis 5 fitted on the end of the change rod 6, which has a bend 6a and is located roughly along a longitudinal direction inside the vehicle between the manual control lever 1 and the gearbox, which is not shown in the figure. It will be noted that the lever 1 is roughly vertical, whilst the change rod is roughly horizontal. Similarly the roughly horizontal pin 4 is located perpendicular to the rod 6, i.e. across the vehicle centre line.

At its other end the change rod 6 has another horizontal clevis 7 working with a roughly vertical pin 8 fixed to the end of a demultiplication link 9 fixed to the gearbox, schematically represented by the fixed plane 10, by means of a ball joint 11.

The control of gear changes inside the gearbox is performed by means of a control lever or change peg 12 placed right inside the gearbox and fastened rigidly to a control shaft 13. Translational movement of the control shaft 13 carrying the change peg 12 enables the gear lines to be selected, whilst rotation of the control shaft 13 causing rotation of the change peg 12 enables a gear to be changed in a given line. These different movements are controlled by the output lever 14 comprising a bent portion 15 fastened by a joint 16 to a set point on the demultiplication link 9. The position of the joint 16 can be modified in accordance with the required demultiplication by sliding along the link 9. The total demultiplication of the movement of the manual lever 1 in the gearbox is given by the ratio between the length of the gearbox output lever 14 and the length of the change peg 12 combined with the total length of the link 9 and the length of the segment of the link 9 included between the ball joint 11 and the position of the sliding joint 16, i.e. portion 9a of the demultiplication link 9.

The manual control device of the invention as illustrated in the figures operates in two stages. A first movement of the manual lever enables the various gear lines to be selected, i.e. the aligned positions of a certain number of ratios in the gearbox and also a movement for shifting the various gears in a given line. As an example, in the gearbox illustrated in the figures selection of the gear lines is performed by a movement of the manual lever 1 across the longitudinal direction of the vehicle along the axis labelled 17 in FIG. 1. A first line corresponds, for example, to reverse, a second line corresponds, for example, to the first and second gears, a third line corresponds, for example, to the third and fourth gears and the fourth line corresponds, for example, to the fifth gear of the gearbox. Transverse movement of the lever 1 is translated into angular movement of end 1c of portion 1b of the lever 1 as illustrated by the arc of a circle in the chain-dotted line 18 in FIG. 1.

Figure 2:
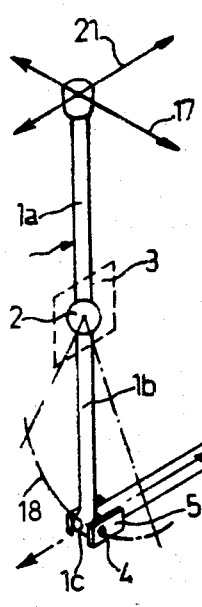
FIG. 2 is a view taken in a vertical plane showing the main elements of the demultiplication device and in particular illustrating the selection of the gear lines.
Figure 2:
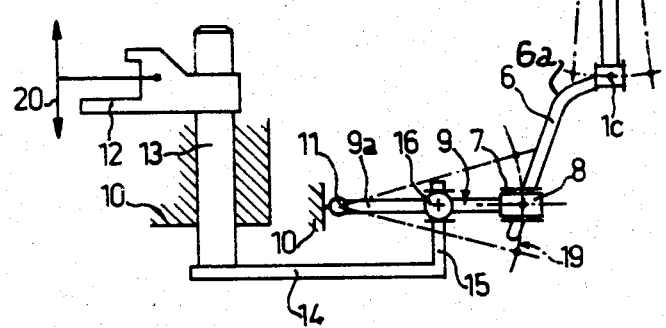

As can be seen in FIG. 2, which shows this operation of selecting a gear line, end 1c of the manual lever 1 is offset transversally with respect to the free end of the demultiplication link 9, owing to the shape of the change rod 6. Angular movement of the end 1c of the manual lever 1 is thus translated, thanks to the ball joint hinge point 11 fixed to the gearbox, into a movement of the demultiplication link 9 which is also angular; the maximum angle of shift can be seen at 19 in FIG. 2. Angular movement of the demultiplication link 9 is translated into a vertical movement of the control shaft 13 inside the gearbox 10. This movement is transmitted by the output lever 14 through joint 16. The change peg 12 rigidly fixed to the control shaft 13 therefore moves vertically inside the gearbox to select a gear line, following the path illustrated by the arrow 20 in FIG. 2.

Figure 3:
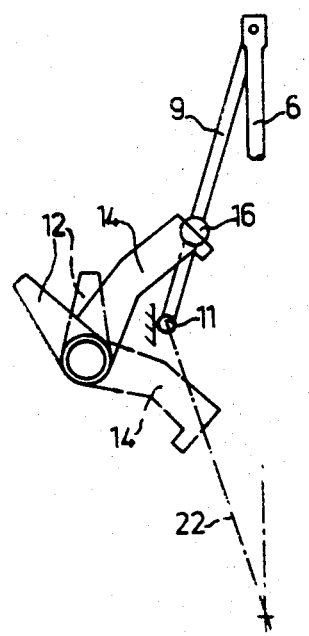
FIG. 3 is a schematic view in section along a horizontal plane showing in particular the gear change peg and the gearbox output lever during a gear change control movement in a particular line.

The gear shift movement in a particular line is performed after the above-mentioned selection operation by a longitudinal movement of the manual lever 1. This movement is represented by arrow 21 in FIG. 1 and is translated into a longitudinal movement of the change rod 6. The change rod 6 communicates this movement to the demultiplication link 9 in a plane which has been determined by the preliminary selection movement. Since link 9 has a fixed ball joint point 11 in the gearbox 10, the link 9 moves through an angle the maximum range of which is shown by the chain-dotted line 22 in FIG. 3. The angular movement of the link 9 is communicated to the end of the output lever 14 via joint 16. The output lever 14 is thus made to move through an angle in rotation round the control shaft 13; this rotation is transmitted to the change peg 12 by means of shaft 13. In FIG. 3 the two possible extreme positions of the change peg 12 and the output lever 14 have been shown respectively in solid and in broken lines.

The present invention has been described with reference to an illustrative example in which the movement ranges for changing gears and for selecting a gear line lay respectively in horizontal and vertical planes. The invention could of course apply to other gearbox arrangements which would lead to movements in other planes.

It will be noted that the vibration filtering function performed by the elastic block 3 is achieved at the position of the connection between the manual lever 1 and the vehicle floor, so that the deformations due to engine vibrations are not amplified owing to the low demultiplication engendered by the gear lever itself.

What is claimed is:

1. A manual device for controlling the gear ratio changes of an automotive vehicle gearbox, comprising a manually operated control lever provided with a fixed swivel point, a gear change peg installed inside the gearbox and capable of undergoing a rotary movement round a control shaft axis and the translational movement along the said shaft axis, and a change rod connected by one of its ends to the control lever in order to transmit the movements of the control lever to the change peg, the change rod being connected at one of its ends to the manual control lever by a joint with one degree of freedom in rotation and at its other end, by a joint with one degree of freedom in rotation, to a demultiplication device installed at least partially inside the gearbox, the fixed joint point of the control lever being so placed on said control lever that the demultiplication due to the control lever is about 1.5, with the whole device producing a total demultiplication in the order of 6 to 7.

2. A manual device for controlling the gear ratio changes of an automotive vehicle gearbox, comprising a manually operated control lever provided with a fixed swivel point, a gear change peg installed inside the gearbox and capable of undergoing a rotary movement round a control shaft axis and a translational movement along the said shaft axis, and a change rod connected by one of its ends to the control lever in order to transmit the movements of the control lever to the change peg, the change rod being connected at one of its ends to the control lever by a joint with one degree of freedom in rotation and at its other end, by a joint with one degree of freedom in rotation, to a demultiplication device installed at least partially inside the gearbox, the demultiplication device comprising a demultiplication link fixed on the gearbox by means of a ball joint and an output lever, fixed to the shaft controlling the change peg, jointed at a point which can be adjusted by sliding along the demultiplication link.

3. The device according to claim 2, wherein the change rod is connected by a joint to one of the ends of the demultiplication link the other end of which is fixed onto the gearbox by means of a ball joint.

4. The device according to claim 3 wherein the control lever is mounted on the chassis or shell of the vehicle by means of a ball joint and an elastic block filtering out the vibrations.

5. The device according to claim 4 wherein the change rod is placed roughly along the longitudinal direction of the vehicle, with the demultiplication link being roughly orthogonal.

6. The device according to claim 5, wherein the end of the control lever is offset transversally from the end of the demultiplication link.

* * * * *